H. P. KRAFT.
SWIVEL NUT.
APPLICATION FILED APR. 22, 1918. RENEWED JULY 3, 1919.

1,330,594.

Patented Feb. 10, 1920.

WITNESS:
René Bruine

INVENTOR
Henry P. Kraft,

By Attorneys,
Fraser, Durk & Myers

UNITED STATES PATENT OFFICE.

HENRY P. KRAFT, OF RIDGEWOOD, NEW JERSEY.

SWIVEL-NUT.

1,330,594.   Specification of Letters Patent.   Patented Feb. 10, 1920.

Application filed April 22, 1918, Serial No. 229,898. Renewed July 3, 1919. Serial No. 308,536.

*To all whom it may concern:*

Be it known that I, HENRY P. KRAFT, a citizen of the United States of America, residing in Ridgewood, in the county of Bergen and State of New Jersey, have invented certain new and useful Improvements in Swivel-Nuts, of which the following is a specification.

This invention relates to swivel nuts, so-called, that is to say, a nut having a washer swiveled to it, so that as the nut is turned the washer may remain stationary, whereby to avoid rubbing against the part against which it is tightened. Such swivel nuts are commonly made as wing nuts or thumb nuts; that is to say, the nut proper has arms or wings projecting on diametrically opposite sides, so that the nut can be turned by the thumb and finger. Such nuts are used in large quantities, and it is desirable to be able to make them with great cheapness. They have heretofore been cut out of solid metal. According to the present invention, the nut is struck up from sheet metal having the special conformation and construction which will be described.

In the acompanying drawings,—

Figure 1:
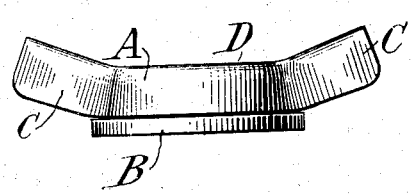
Figure 1 is a side elevation of a swivel nut embodying the present invention.
Figure 3:
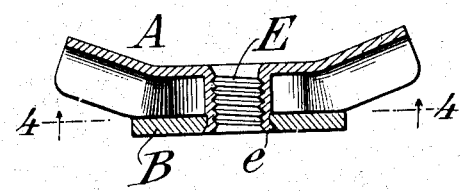
Fig. 3 is a mid-section on the line 3—3 of Fig. 2.

Referring to the drawings, A is the nut proper and B is the swivel washer. The nut A has wings or arms C C and a central body portion D in cup form, within which is a neck portion E in which the screw-thread is formed.

Figure 7:
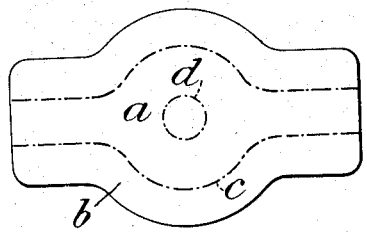
Fig. 7 is a plan of the stamping from which the nut is formed.
Figure 2:
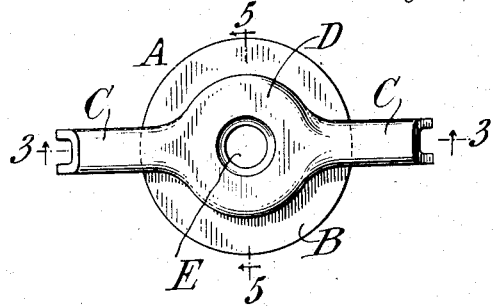
Fig. 2 is a plan thereof.
Figure 4:
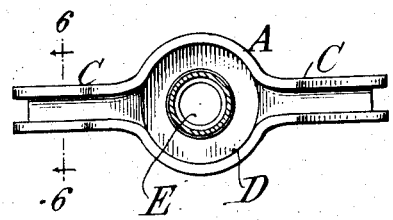
Fig. 4 is an inverted plan of the nut proper, its lower portion being in section on the line 4—4 in Fig. 3.

The washer A is formed by stamping out a blank *a*, shown in Fig. 7, from a flat sheet of brass or other metal plate. Its marginal portions *b* outside the dotted lines *c* are turned down by a stamping operation. The central portion indicated by the area *d* in Fig. 7 is forced down by a drawing operation and punched through to form the central neck E. By a final stamping or drawing operation the ears C C are turned up and the whole structure is brought to the shape shown. Two operations then remain, namely, the cutting of the screw-thread within the neck E, and the reducing of the outer portion of the neck at its bottom end so that it may form a close but free joint with the hole through the washer B. The two parts A and B are then united by expanding the reduced lower end of the neck at *e*, whereby to form a loose but secure joint with the washer, this joint being so loose as to permit the free rotation of the nut relatively to the washer.

Figure 5:
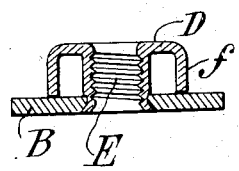
Fig. 5 is a transverse section on the line 5—5 in Fig. 2.
Figure 6:
Fig. 6 is a transverse section on the line 6—6 in Fig. 4.
Figure 8:
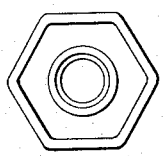

The finished product has the cupped body portion D with its outer pendant rim *f* extending down to and bearing upon the top of the washer, as shown in Fig. 5. This affords a broad bearing which gives a steady and non-tilting engagement between the two members and relieves the swivel joint of any strain. When in use the nut has substantially the appearance of a solid nut, and by reason of the corrugating of the metal and the stiffening effect of the stamping operations, the hollow nut has the same effective strength as a solid nut. At the same time it is much more cheaply produced, and is applicable for practically every purpose for which solid nuts have heretofore been used.

The construction may be varied within the scope of the appended claims without departing from the invention.

I claim as my invention:—

1. A nut formed of sheet metal, comprising an outer cupped body portion and a central screw-threaded neck extending through and inclosed within the outer body portion, and the body portion terminating in an outer rim adapted to afford a firm bearing against a washer.

2. A swivel nut comprising a nut proper and washer, the nut proper formed of cupped sheet metal having a central screw-threaded neck the lower end of which has a swivel engagement with the washer, and the outer rim of which affords a broad bearing against the face of the washer.

3. A nut formed of sheet metal and comprising a cupped body portion having a central threaded neck and an outer rim portion inclosing the neck and forming an edge bearing, and wings projecting from the opposite sides of the body.

4. A nut formed of a single piece of elongated sheet metal having its end portions folded together to form wings and its middle portion cupped, and with a central threaded neck within the cupped portion.

5. A nut of sheet metal, comprising an outer cupped body portion and an inner cylindrical undivided threaded neck portion, the rim of the body portion extended to nearly the same plane as the neck portion and adapted to serve as the bearing face of the nut.

6. A nut formed of sheet metal comprising an outer cupped body portion and a central screw-threaded neck of one thickness of metal extending through and inclosed within the outer body portion, and the body portion terminating in an outer rim adapted to afford an edge bearing, and a washer associated therewith to receive such bearing.

7. A nut formed of sheet metal comprising an outer cupped body portion and a central neck extending within and inclosed by said body portion, the neck having a screw-threaded passage extending through it, and the body portion having integral wings.

8. A nut formed of sheet metal comprising an outer cupped body portion and a central neck extending within and inclosed by said body portion, the neck having a screw-threaded passage extending through it, and the metal of the body portion being elongated and folded to form wings, In witness whereof, I have hereunto signed my name.

HENRY P. KRAFT.